(12) United States Patent
Ichiyama et al.

(10) Patent No.: US 8,155,215 B2
(45) Date of Patent: Apr. 10, 2012

(54) TRANSMISSION SYSTEM, TRANSMITTER, RECEIVER, AND TRANSMISSION METHOD

(75) Inventors: Kiyotaka Ichiyama, Tokyo (JP); Masahiro Ishida, Tokyo (JP)

(73) Assignee: Advantest Corporation, Tokyo (JP)

( * ) Notice: Subject to any disclaimer, the term of this patent is extended or adjusted under 35 U.S.C. 154(b) by 1320 days.

(21) Appl. No.: 11/770,742

(22) Filed: Jun. 29, 2007

(65) Prior Publication Data
US 2009/0103672 A1 Apr. 23, 2009

(51) Int. Cl.
*H04L 27/00* (2006.01)
(52) U.S. Cl. ........ 375/259; 375/295; 375/316; 375/354; 375/360; 713/400; 327/165; 327/100
(58) Field of Classification Search ............. 375/259, 375/295, 316, 354, 360; 713/400; 327/165, 327/100
See application file for complete search history.

(56) References Cited

U.S. PATENT DOCUMENTS 7,418,038 B2 * 8/2008 Kikuchi ................ 375/257
2003/0001640 A1 * 1/2003 Lao et al. ............... 327/165

* cited by examiner

*Primary Examiner* — Chieh M. Fan
*Assistant Examiner* — Leila Malek
(74) *Attorney, Agent, or Firm* — Jianq Chyun IP Office

(57) ABSTRACT

There is provided a circuit constituted by small-sized and simple logical gates which reduces the bit errors generated in a data sequence received by a receiver. A transmission system, in which a data sequence is transferred, includes a transmitter that transmits a first transfer signal including an edge-present data waveform which has (i) a first timing edge indicating a timing to obtain data included in the data sequence and (ii) a level signal indicating a signal level corresponding to a value of the data, and a receiver that outputs the value of the data in accordance with the signal level which is detected at the timing indicated by the first timing edge of the edge-present data waveform.

7 Claims, 4 Drawing Sheets

TRANSMISSION SYSTEM, TRANSMITTER, RECEIVER, AND TRANSMISSION METHOD

BACKGROUND

1. Technical Field

The present invention relates to a transmission system, a transmitter, a receiver, and a transmission method. More particularly, the present invention relates to a transmission system, a transmitter, a receiver and a transmission method for transmitting serial data by using a clock signal.

2. Related Art

A known transmission system performs wired/wireless/optical transmission of serial data sequences by using a clock signal. A transmitter for use in serial data transmission outputs a data signal to be transmitted based on an original data sequence by using the edge timing of a clock signal. A receiver samples the received data signal at the edge timing of a clock signal which is synchronized with the data signal, to read the original data sequence. Here, when there is a difference in edge timing between the clock signal and data signal received by the receiver, the received data sequence may have bit errors.

There are mainly two different methods to enable the receiver to obtain a clock signal which is synchronized with the received data signal. According to one of the methods, the clock signal used by the transmitter to generate the data signal is transmitted to the receiver in parallel with the data signal via a different transmission path from the data signal. The receiver thus receives the clock signal which is used for the transmission. According to the other method, the transmitter generates the data signal by embedding the clock signal into the original data sequence, and transmits the generated data signal. In this case, the receiver recovers the clock signal from the received data signal, and uses the recovered clock signal.

The former method has the following problem. Jitter (hereinafter referred to as "deterministic jitter") is generated in the data signal received by the receiver depending on the characteristics of the transmission path, since the data signal has irregular occurrences of the edge timings. On the other hand, such deterministic jitter depending on the characteristics of the transmission path is hardly generated in the clock signal since the clock signal has a regular interval between adjacent edge timings. Therefore, according to the former method, a difference in timing is generated in correspondence with the difference in amount of deterministic jitter between the data signal and clock signal which are received by the receiver. This timing difference is not corrected. Therefore, when the former method is employed, bit errors may occur at the receiver due to the deterministic jitter injected to the data sequence received by the receiver.

The latter method also has a problem. The receiver has a phase locked loop (PLL) circuit which performs feedback control to cause the edge timing of the data signal received by the receiver to be synchronized with the edge timing of the clock signal recovered by the receiver. The PLL circuit includes therein a phase detector, a loop filter, and a frequency-variable oscillator.

Here, as long as the frequency of the jitter injected to the data signal falls within the loop bandwidth of the loop filter, the phase of the clock signal is varied in accordance with the jitter injected to the data signal. If this is the case, the difference in timing between the data signal and clock signal is reduced, and the bit errors can be thus prevented. However, when the frequency of the jitter injected to the data signal takes a value outside the loop bandwidth, the phase of the clock signal can not be varied in accordance with the jitter injected to the data signal. In this case, there is a difference in timing between the data signal and clock signal, and bit errors may therefore occur.

Here, when the successive logical values of the data signal received by the receiver are the same, the received data signal does not have an edge. Therefore, the receiver relating to the latter method can not perform feedback control. In this case, the receiver relating to the latter method can not adjust the timing difference between the received data signal and the recovered clock signal, and therefore can not reduce the bit errors. Furthermore, since the receiver relating to the latter method includes therein a PLL circuit or the like, the receiver requires more complicated circuits and more advanced design techniques than the receiver relating to the former method. As a result, the receiver relating to the latter method requires a larger area for the circuits and a higher cost.

SUMMARY

In view of the above, it is an object of an aspect of the present invention to provide a transmission system, a transmitter, a receiver and a transmission method which are capable of overcoming the above drawbacks accompanying the related art. The above and other objects can be achieved by combinations described in the independent claims. The dependent claims define further advantageous and exemplary combinations of the present invention.

According to a first aspect related to the innovations herein, one exemplary system may include a transmission system in which a data sequence is transferred. The transmission system includes a transmitter that transmits a first transfer signal including an edge-present data waveform which has (i) a first timing edge indicating a timing to obtain data included in the data sequence and (ii) a level signal indicating a signal level corresponding to a value of the data, and a receiver that outputs the value of the data in accordance with the signal level which is detected at the timing indicated by the first timing edge of the edge-present data waveform.

Here, all the necessary features of the present invention are not listed in the summary. The sub-combinations of the features may become the invention.

DESCRIPTION OF EXEMPLARY EMBODIMENTS

Hereinafter, one aspect of the present invention will be described through an embodiment. The embodiment does not limit the invention according to the claims, and all the combinations of the features described in the embodiments are not necessarily essential to means provided by aspects of the invention.

Figure 1:
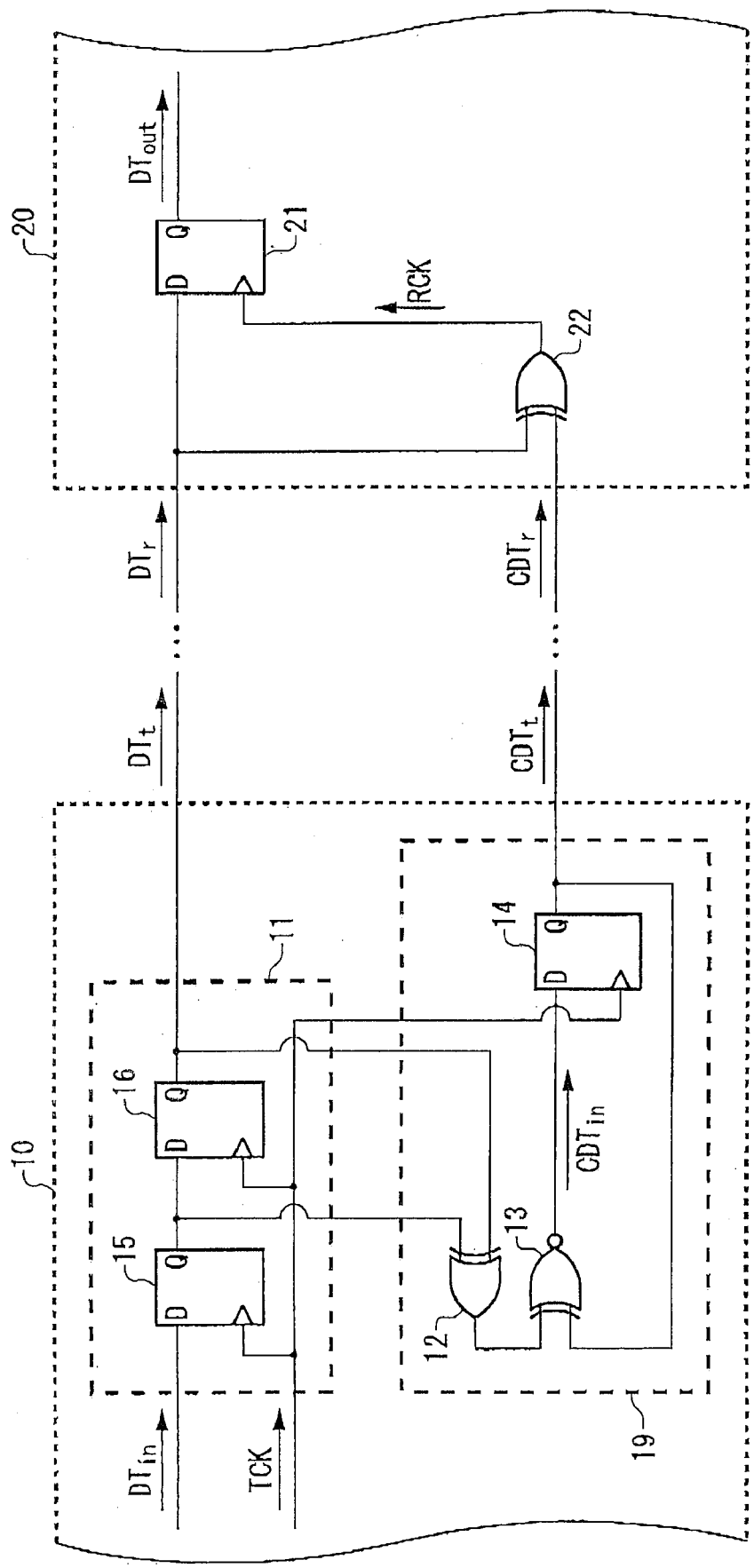
FIG. 1 illustrates an exemplary configuration of a transmission system 1 relating to the present embodiment.

FIG. 1 illustrates an exemplary configuration of a transmission system relating to the present embodiment.

A transmission system 1 relating to the present embodiment reduces the bit errors which are generated due to deterministic jitter in a data sequence received by a receiver. The transmission system 1 includes therein a transmitter 10 and a receiver 20. In the transmission system 1, a data sequence DT is transferred. The data sequence DT is a sequence made up by pieces of binary data each indicating one of the signal levels H and L, and contains, in its data shape, information indicating the signal levels and varying timings. The transmitter 10 receives an input signal DTin indicating the data sequence DT, and transmits a transmission signal DTt which is a first transfer signal and a complementary transmission signal CDTt which is a second transfer signal. The receiver 20 receives a reception signal DTr which is the first transfer signal and a complementary reception signal CDTr which is the second transfer signal, and outputs an output signal DTout.

According to the transmission system 1 relating to the present embodiment, the first transfer signal at the transmitter 10 contains information indicating a timing edge DEtn (n hereinafter indicates a positive integer and the timing edge may be referred to simply as "edge") at which the signal level of the input signal DTin varies and information indicating the signal level of the input signal DTin. The second transfer signal at the transmitter 10 contains information indicating a timing to obtain the signal level of the input signal DTin at which the signal level of the input signal DTin does not vary. The first and second transfer signals transmitted from the transmitter 10 are respectively added with a fixed amount of delay and injected with jitter in the transmission path, and received at the receiver 20.

The transmitter 10 sequentially obtains the input signal DTin at the timing indicated by the transmission clock TCK, to generate the transmission signal DTt and complementary transmission signal CDTt. The transmitter 10 includes therein a shift register 11 which is shown as an example of a first transmitting section, and an XOR gate 12, an XNOR gate 13 and a D flip-flop 14 which are collectively shown as an example of a second transmitting section 19. The shift register 11 includes therein cascaded D flip-flops 15 and 16. The shift register 11 receives the data sequence DT in the form of the input signal DTin, and outputs the transmission signal DTt in accordance with the timing of the transmission clock TCK.

Each of the D flip-flops 15 and 16 sequentially obtains, from the preceding stage, the signal level (H or L) of the input signal DTin at the input timing of the transmission clock TCK. Each of the D flip-flops 15 and 16 then outputs the obtained signal level of the input signal DTin to the following stage at the next input timing of the transmission clock TCK.

The XOR gate 12 outputs a logical XOR between the outputs from the D flip-flops 15 and 16. In this way, the XOR gate 12 outputs a logical value of "1" in a cycle in which the signal level of the input signal DTin varies. The XNOR gate 13 outputs a logical XNOR between the outputs from the XOR gate 12 and D flip-flop 14. In this way, the XNOR gate 13 outputs the same logical value as the D flip-flop 14 in a cycle in which the signal level of the input signal DTin varies, and outputs a logical value obtained by inverting the logical value output from the D flip-flop 14 in a cycle in which the signal level of the input signal DTin does not vary.

The D flip-flop 14 obtains, in accordance with the edge timing of the transmission clock TCK, the signal level of the complementary input data signal CDTin output from the XNOR gate 13, and outputs the obtained signal level of the complementary input data signal CDTin as the complementary transmission signal CDTt. In this way, the XNOR gate 13 and D flip-flop 14 can output the complementary transmission signal CDTt whose signal level varies at the timing of the transmission clock TCK at which the signal level of the transmission signal DTt does not vary.

The receiver 20 includes therein a D flip-flop 21 and an XOR gate 22. The receiver 20 generates a reception clock RCK based on the reception signal DTr and complementary reception signal CDTr, and samples the reception signal DTr by means of the generated reception clock RCK. The D flip-flop 21 is shown as an example of a data obtaining section relating to the present embodiment. The D flip-flop 21 obtains the signal level of the reception signal DTr in accordance with the edge timing of the reception clock RCK output from the XOR gate 22, and outputs the obtained signal level as the output signal DTout. The XOR gate 22 is shown as an example of a clock generating section relating to the present embodiment. The XOR gate 22 outputs, as the reception clock RCK, a logical XOR between the reception signal DTr and complementary reception signal CDTr (the second transfer signal). To be more specific, the XOR gate 22 varies the signal level of the output signal from the logical value "1" to the logical value "0" or from the logical value "0" to the logical value "1", in accordance with the timing at which the signal level of one of the reception signal DTr and complementary reception signal CDTr varies from the logical value "1" to the logical value "0" or from the logical value "0" to the logical value "1", thereby outputting the resulting signal as the reception clock RCK.

The receiver 20 relating to the present embodiment obtains the received data sequence at the varying timing of the reception signal DTr, or, when the signal level of the reception signal DTr does not vary, at the varying timing of the complementary reception signal CDTr. In this way, the transmission system 1 can adjust the timing to obtain the reception signal DTr in compliance with the jitter generated in the reception signal DTr, thereby reducing the bit error rate.

FIGS. 2A to 2H are timing charts which are used to illustrate an exemplary operation performed by the transmission system 1 shown in FIG. 1.

FIG. 2A illustrates an example of the input signal DTin received by the transmitter 10. Referring to the input signal DTin, the signal level varies from the L level to H level at the timing edges of DEt1, DEt5 and DEt8, and varies from the H level to the level at the timing edges of DEt4, DEt6 and DEt9.

FIG. 2B illustrates an example of the transmission clock signal TCK used by the transmitter 10. The transmission clock signal TCK has rising edges of the timing edges TE0 to TE9. Here, the timing edges TE0 to TE9 occur at timings t0 to t9.

FIG. 2C illustrates an example of the transmission signal DTt transmitted from the transmitter 10. For example, the transmitter 10 generates and outputs the transmission signal DTt the signal level of which varies at the timings t1, t4, t5, t6, t8 and t9 of the transmission clock signal TCK but does not vary at the timings t2, t3 and t7. In this case, the transmission signal DTt has rising edges of the timing edges PEt1 (t1), PEt5 (t5), and PEt8 (t8), and falling edges of the timing edges PEt4 (t4), PEt6 (t6) and PEt9 (t9).

In the following, the transmission signal DTt is explained with reference to FIGS. 2A to 2C. The transmission signal DTt is the first transfer signal for the transmission system. The transmitter 10 transmits the first transfer signal. The transmission signal DTt is made up by a data waveform which has a first timing edge PEtn and signal levels before and after the first timing edge PEtn (an edge-present data waveform) and a data waveform which does not have a first timing edge PEtn and has a single signal level (an edge-absent data waveform).

In the transmission signal DTt, the edge-present data waveform is found at, for example, the timings t1, t4, t5, t6, t8 and t9 in FIG. 2C, and contains the first timing edge PEtn and signal levels before and after the variation at the first timing edge PEtn. In the transmission signal DTt, on the other hand, the edge-absent data waveform is found at, for example, the timings t2, t3 and t7 shown in FIG. 2C, and contains no first timing edge PEtn and has the single signal level at the timing. Here, a level signal is a signal indicating one of the signal levels H and L. A level signal has an edge-absent data waveform.

The timing edge PEtn of the transmission signal DTt at which the signal level varies indicates a timing to obtain the data at the reception side. To be specific, since the reception clock RCK is generated in accordance with the timing edge PErn at which the timing edge PEtn of the transmission side is received at the receiver 20, the timing edge PEtn itself indicates the timing to obtain the data. Hereinafter, the timing edge PEtn of the transmission signal DTt is referred to as the first timing edge. Referring to the transmission signal DTt output from the transmitter 10, its data waveform containing therein the first timing edge PEtn has signal levels before and after the first trimming edge PEtn.

FIG. 2D illustrates an example of the complementary transmission signal CDTt transmitted from the transmitter 10. The transmitter 10 samples the signal level of the input signal DTin at the timings t0 to t9 of the transmission clock signal TCK, thereby detecting the timing of the transmission clock signal TCK at which the signal level does not vary (the timings t2, t3 and t7). Based on this, the transmitter 10 generates and outputs the complementary transmission signal CDTt whose signal level varies at the timings t2, t3 and t7 but does not vary at the timings t1, t4, t5, t6, t8 and t9. For example, the complementary transmission signal CDTt has rising edges of the timing edges SEt2 (t2) and SEt7 (t7), and a falling edge of the timing edge SEt3 (t3).

In the following, the complementary transmission signal CDTt is explained with reference to FIGS. 2A, 2B and 2D. The complementary transmission signal CDTt is the second transfer signal for the transmission system. The transmitter 10 transmits the second transfer signal in addition to the first transfer signal. The complementary transmission signal CDTt is made up by a data waveform which has a second timing edge SEtn and signal levels before and after the second timing edge SEtn (an edge-present data waveform) and a data waveform which has no second timing edge SEtn and has a single signal level (an edge-absent data waveform).

In the complementary transmission signal CDTt, the edge-present data waveform is found at, for example, the timings t2, t3, and t7 in FIG. 2D, and contains the second timing edge SEtn and signals levels before and after the variation at the second timing edge SEtn. In the complementary transmission signal CDTt, on the other hand, the edge-absent data waveform is found at, for example, the timings t1, t4, t5, t6, t8 and t9 in FIG. 2D, and contains no second timing edge SEtn and has a single signal level at the timing.

The reception clock RCK is generated based on the timing edge SErn at which the timing edge SEtn at the transmission side is received by the receiver 20. Hereinafter, the timing edge SEtn of the complementary transmission signal CDTt is referred to as the second timing edge. Referring to the complementary transmission signal CDTt output from the transmitter 10, its data waveform containing therein the second timing edge SEtn has signal levels before and after the second timing edge SEtn.

The first and second transfer signals are complementary to each other in such a manner that, at each sampling timing indicated by the transmission clock TCK, one of the first and second transfer signals has an edge-present data waveform and the other has an edge-absent data waveform. Therefore, when the timing edges of the first and second transfer signals are added together, the total number of the timing edges becomes equal to the total number of the sampling timing edges indicated by the transmission clock TCK.

Figure 2:
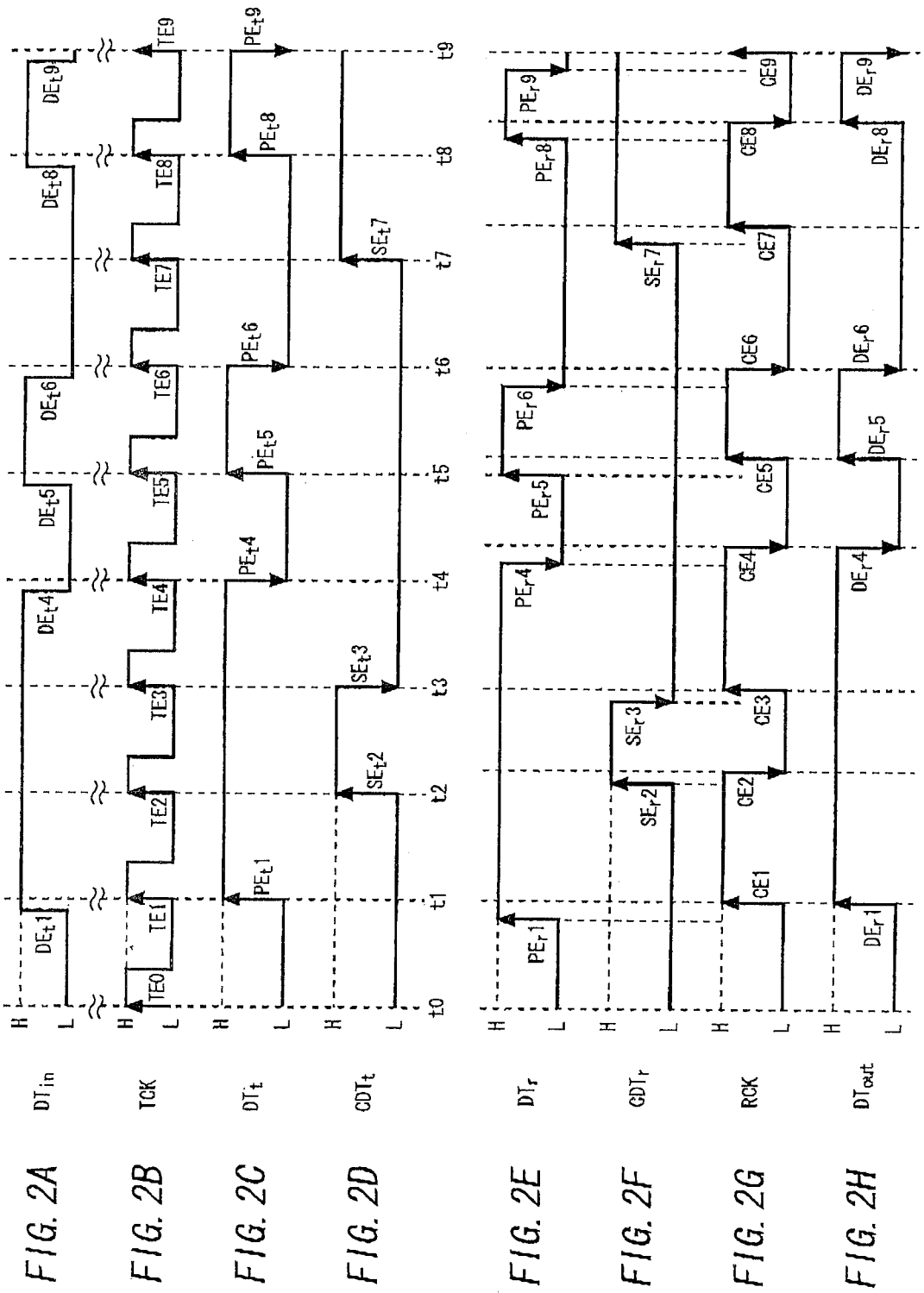
FIGS. 2A to 2H are timing charts which are used to illustrate an exemplary operation performed by the transmission system 1 shown in FIG. 1.

FIG. 2E illustrates an example of the reception signal DTr received by the receiver 20. The receiver 20 receives, as the reception signal DTr, the transmission signal DTt transmitted from the transmitter 10 (the first transfer signal). To be specific, the signal level of the reception signal DTr received by the receiver 20 varies from the level L to the level H at the timing edges PEr1, PEr5, and PEr8, and varies from the level H to the level L at the timing edges PEr4, PEr6, and PEr9. The signal level of the reception signal DTr received by the receiver 20 varies in substantially the same manner as the signal level of the transmission signal DTt. However, the reception signal DTr received by the receiver 20 is affected by the fixed amount of delay and jitter in the transmission path. In more detail, the timings of the timing edges PEr1 to PEr9 of the reception signal DTr received by the receiver 20 are different from the timings of the timing edges of the first transfer signal output from the transmitter 10 since the fixed amount of delay is added to and jitter is injected to, in the transmission path, the timings t1 to t9 of the transmission clock signal TCK. It should be noted that the fixed amount of delay is not shown in FIG. 2.

FIG. 2F illustrates an example of the complementary reception signal CDTr received by the receiver 20. The receiver 20 receives, as the complementary reception signal CDTr, the complementary reception signal CDTt (the second transfer signal) transmitted from the transmitter 10. To be specific, the signal level of the complementary reception signal CDTr received by the receiver 20 varies from the level L to the level H at the timing edges SEr2 and SEr7, and varies from the level H to the level L at the timing edge SEr3. The signal level of the complementary reception signal CDTr received by the receiver 20 varies in substantially the same manner as the signal level of the complementary transmission signal CDTt.

The complementary reception signal CDTr received by the receiver 20 is also affected by the fixed amount of delay and jitter in the transmission path. To be specific, the timings of the timing edges SEr2, SEr3 and SEr7 of the complementary reception signal CDTr received by the receiver 20 correspond to the result of adding the fixed amount of delay to and injecting jitter to the timings t2, t3 and t7 of the transmission clock signal TCK in the transfer path. It should be noted that the fixed amount of delay is not shown in FIG. 2F either.

FIG. 2G illustrates an example of the reception clock signal RCK which is used as a reference clock signal in the receiver 20. The receiver 20 generates the reception clock RCK based on the timing edge PErn of the received data signal DTr and the timing edge SErn of the received complementary reception signal CDTr. The reception clock signal RCK has clock edges CEn generated in accordance with the first and second timing edges PErn and SErn. To be specific, the receiver 20 arranges, in accordance with the respective received timings, the timing edges PEr1, PEr4, PEr5, PEr6, PEr8 and PEr9 of the reception signal DTr and the timing edges SEr2, SEr3 and SEr7 of the complementary reception signal CDTr.

In a repeated manner, the receiver 20 alternately generate a rising edge in which the signal level varies from the level L to the level H and a falling edge in which the signal level varies from the level H to the level L, in accordance with the arrangement of the timing edges PErn and SErn. The receiver 20 uses the signal generated in this manner as the reception clock RCK. For example, the signal level of the reception clock signal RCK generated by the receiver 20 varies from the level L to the level H at the timing edges CE1, CE3, CE5, CE7 and CE9, and varies from the level H to the level L at the timing edges CE2, CE4, CE6 and CE8. The receiver 20 generates the respective timing edges of the reception clock signal RCK based on the reception signal DTr and complementary reception signal CDTr in such a manner that the influence of the fixed amount of delay and jitter included in the reception signal DTr and complementary reception signal CDTr is kept in the reception clock signal RCK.

FIG. 2H illustrates the output signal DTout output from the receiver 20. The receiver 20 samples the signal level of the reception signal DTr at each of the edge timings of the reception clock signal RCK, to generate the output signal DTout. For example, the signal level of the output signal DTout generated by the receiver 20 varies from the level L to the level H at the timing edges of CE1, CE5 and CE8, and varies from the level H to the level L at the timing edges CE4, CE6 and CE9, in accordance with the signal level of the reception signal DTr.

In the following, the relation between the reception signal DTr and output signal DTout is described with reference to FIGS. 2E, 2G and 2H.

The timing edges of the reception signal DTr and the timing edges of the reception clock signal RCK are similarly influenced by the fixed amount of delay and jitter. To be specific, when the timing edges of the reception signal DTr axe delayed along the time axis, the timing edges of the reception clock signal RCK are also delayed by the same amount along the time axis. On the other hand, when the timing edges of the reception signal DTr are advanced along the time axis, the timing edges of the reception clock signal RCK are also advanced by the same amount along the time axis. Therefore, the influence of the fixed amount of delay and jitter can be ignored by sampling the timing edges of the reception signal DTr at the timing edges of the reception clock signal RCK.

The following describes the specific operations performed by and the signal inputs/outputs executed at the respective constituents of the transmission system 1 with reference to FIG. 1 and FIGS. 2A to 2H. The shift register 11 of the transmitter 10 (the first transmitting section) transmits the transmission signal DTt containing therein the edge-present and edge-absent data waveforms. For example, the shift register 11 outputs, as the transmission signal DTt, the data values included in the input signal DTin in accordance with the respective input timings of the transmission clock signal TCK. Here, the shift register 11 sequentially outputs, as the transmission signal DTt, an edge-present data waveform which contains a first timing edge PEtn and level signals indicating the data values before and after the first timing edge PEtn or an edge-absent data waveform which is a level signal indicating a data value in compliance with a data pattern to be transmitted. For example, when the data values included in the input signal DTin are different between a given cycle and its preceding cycle of the transmission clock signal TCK, the shift register 11 transmits, as the transmission signal DTt, an edge-present data waveform whose signal level (logical value) varies from the level corresponding to the data value in the preceding cycle to the level corresponding to the data value in the given cycle at the first timing edge PEtn.

On the other hand, when the signal levels included in the input signal DTin axe the same in a given cycle and its preceding cycle of the transmission clock signal TCK, the shift register 11 transmits, as the transmission signal DTt, an edge-absent data waveform which has no first timing edge PEtn and thus has a level signal.

The second transmitting section 19 of the transmitter 10 transmits the complementary transmission signal CDTt (the second transmission signal) which has the second timing edge SEtn instead of the first timing edge PEtn. In the second transmitting section 19, the XOR gate 12, for example, outputs a logical XOR between input data into and output data from the flip-flop 16 of the shift register 11. In this way, the XOR gate 12 outputs the logical value of "1" when the signal levels included in the input signal DTin are different between a given cycle and its preceding cycle of the transmission clock signal TCK. On the other hand, the XOR gate 12 outputs the logical value of "0" when the signal levels included in the input signal DTin are the same in a given cycle and its preceding cycle of the transmission clock signal TCK.

The XNOR gate 13 outputs a logical XNOR between the outputs from the XOR gate 12 and D flip-flop 14. In this way, when the signal level output from the XOR gate 12 indicates the logical value of "1", the XNOR gate 13 outputs a logical value which is obtained by inverting the output from the D flip-flop 14. On the other hand, when the signal level output from the XOR gate 12 indicates the logical value of "0", the XNOR gate 13 outputs the same logical value as the D flip-flop 14. The D flip-flop 14 outputs, as the complementary transmission signal CDTt, the internal complementary transmission signal CDTin output from the XNOR gate 13 in accordance with the cycle of the transmission clock signal TCK. In other words, in a cycle of the transmission clock signal TCK in which the data value included in the input signal DTin is the same as the data value in the preceding cycle, the second transmitting section 19 generates the complementary transmission signal CDTt which has the second timing edge SEtn and whose signal level varies.

On the other hand, in a cycle of the transmission clock signal TCK in which the data value included in the input signal DTin is different from the data value in the preceding cycle, the second transmitting section 19 generates the complementary transmission signal CDTt which has the same signal level as in the preceding cycle. According to the above description of the present embodiment, the complementary transmission signal CDTt includes only the second timing edge SEtn. However, the complementary transmission signal CDTt may additionally include therein the first timing edge PEtn, for example. In this case, when the timing edges occur at the same time between the transmission signal DTt and complementary transmission signal CDTt, one of the timing edges may be used for generating the reception clock signal RCK.

The XOR gate 22 of the receiver 20 generates the reception clock signal RCK by calculating a logical XOR between the received reception signal DTr and complementary reception signal CDTr. The D flip-flop 21 obtains and outputs the output signal DTout by sampling the signal level of the reception signal DTr at the timing indicated by the clock edge CEn of the reception clock signal RCK.

At the receiver 20, the reception signal is received at, for example, the signal receiving section of the D flip-flop 21. The signal receiving section of the D flip-flop 21 receives the reception signal DTr which is the first transfer signal. In addition, one of the signal receiving sections of the XOR gate 22 receives the reception signal DTr which is the first transfer signal. The other signal receiving section of the XOR gate 22 receives the complementary reception signal CDTr which is the second transfer signal. The receiving section of the receiver 20 includes, for example, the D flip-flop 21 and XOR gate 22. The D flip-flop 21 outputs a data value corresponding to the signal level which is obtained by detecting the edge-present data waveform of the reception signal DTr at the edge timing of the reception clock signal RCK. The XOR gate 22 outputs the reception clock signal RCK.

When receiving the edge-present data waveform of the reception signal DTr, the receiver 20 uses the first timing edge PErn for the edge timing CEn of the reception clock signal RCK. When receiving the edge-absent data waveform of the reception signal DTr, the receiver 20 uses the second timing edge SErn for the edge timing CEn of the reception clock signal RCK. In the above-described manner, the receiver 20 determines the edge timing CEn of the reception clock signal RCK by using the first timing edge PErn of the reception signal DTr and the second timing edge SErn of the complementary reception signal CDTr.

The receiver 20 detects the signal level of the reception signal DTr at the edge timing CEn of the reception clock signal RCK, thereby outputting the detected signal level as the output signal DTout. Here, the receiver 20 detects the signal level of the reception signal DTr at the timing indicated by the second timing edge SErn of the complementary reception signal CDTr, and outputs the detected signal level as the output signal DTout.

Figure 3:
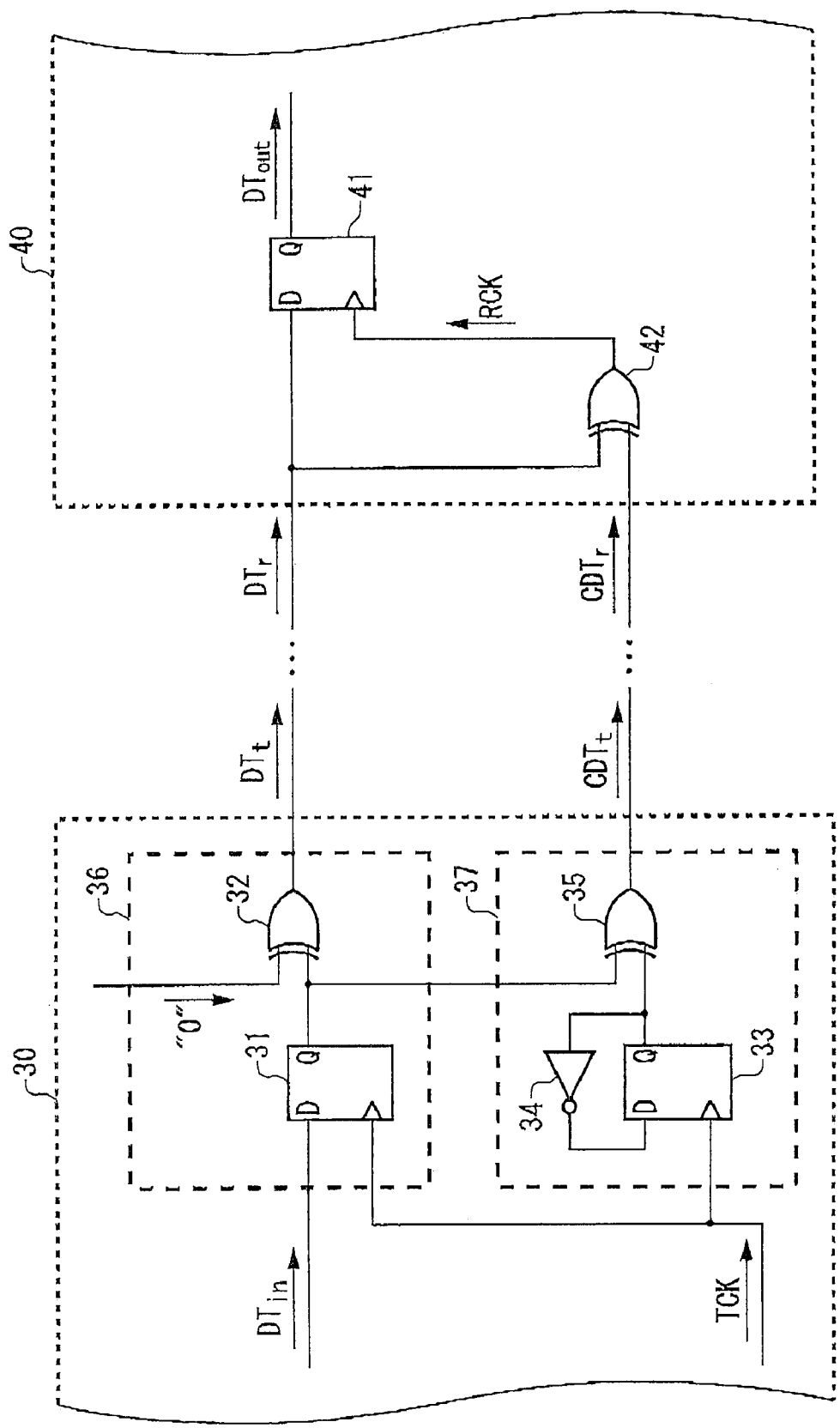
FIG. 3 illustrates a modification example of the configuration of the main portion in a transmission system 2 relating to the present embodiment.

FIG. 3 illustrates a modification example of the transmission system relating to the present embodiment.

A transmission system 2 includes therein a transmitter 30 and a receiver 40. In the transmission system 2, data DT is transferred. The receiver 40 has a similar configuration to the receiver 20 included in the transmission system 1 shown in FIG. 1. The following description of the modification example puts focus on the difference between the transmitter 30 and the transmitter 10 included in the transmission system shown in FIG. 1, and does not mention the similarities between the transmitters 30 and 10.

The transmitter 30 outputs the transmission signal DTt and complementary transmission signal CDTt. The transmitter 30 includes therein a first transmitting section 36 and a second transmitting section 37. The first transmitting section 36 includes therein a D flip-flop 31 and an XOR gate 32. The second transmitting section 37 includes therein a D flip-flop 33, an inverter 34 and an XOR gate 35. The first transmitting section 36 receives the data DT in the form of the input signal DTin, and outputs the transmission signal DTt in accordance with the timings indicated by the transmission clock TCK. In the first transmitting section 36, the D flip-flop 31 receives the input signal DTin in accordance with the timings indicated by the transmission clock TCK. The XOR gate 32 outputs, as the transmission signal DTt, a logical XOR between the output from the D flip-flop 31 and the logical value of "0" input thereto from an external control apparatus. In this way, the XOR gate 32 outputs the logical value of "1" in a cycle in which the input signal DTin indicates the logical value of "1", and outputs the logical value of "0" in a cycle in which the input signal DTin indicates the logical value of "0". In the above-described manner, the output timing of the XOR gate 32 is adjusted so as to match the output timing of the XOR gate 35 of the second transmitting section 37. Here, when the output timings of the transmission signal DTt and complementary transmission signal CDTt substantially match each other, the XOR gate 32 may be omitted.

In the second transmitting section 37, the logical value of the signal output from the D flip-flop 33 is inverted by the inverter 34 in accordance with each timing of the transmission clock TCK, and then returned to the input of the D flip-flop 33. The XOR gate 35 outputs, as the complementary transmission signal CDTt, a logical XOR between the outputs from the D flip-flops 31 and 33. The signal level of the complementary transmission signal CDTt output from the XOR gate 35 varies at the timing of the transmission clock TCK at which the signal level of the transmission signal DTt does not vary.

With the above-described configuration, the transmission system 2 relating to the modification example of the present embodiment can realize a circuit constituted by small-sized and simple logical gates which can reduce the bit errors generated in the data received by the receiver 40.

Figure 4:
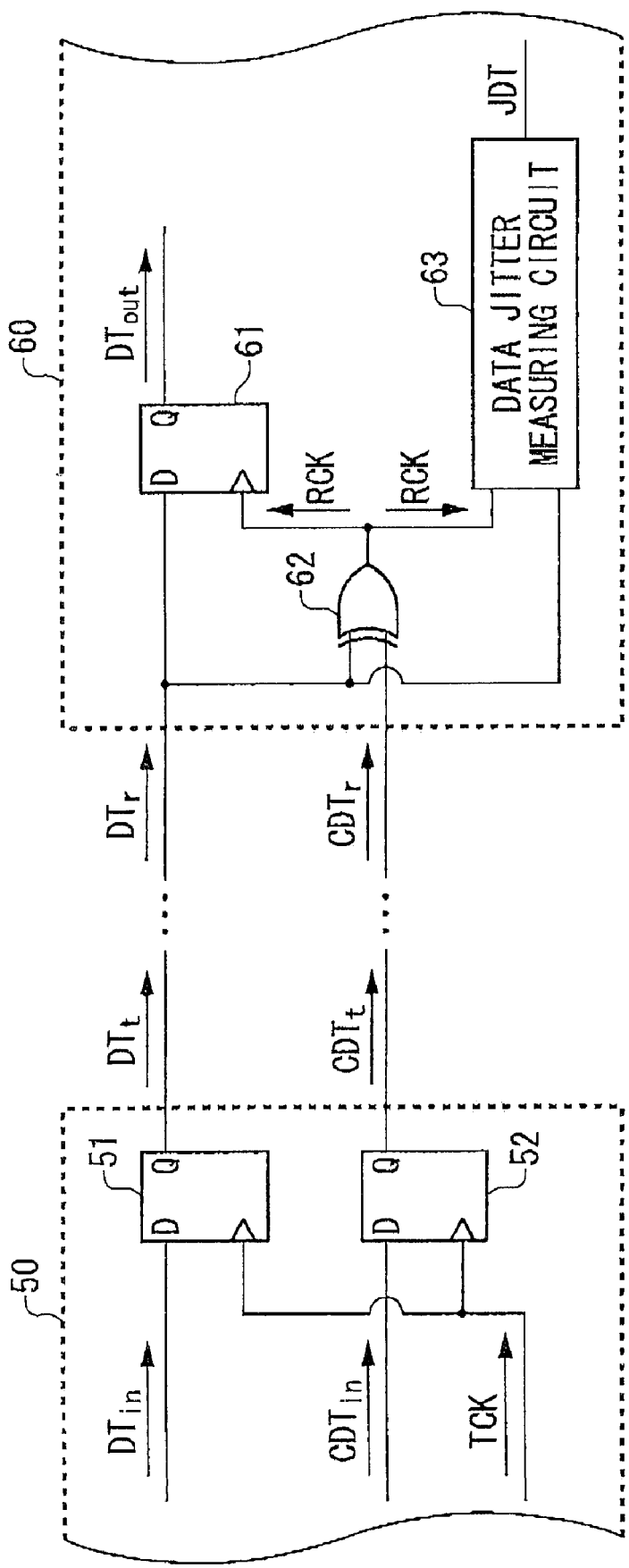
FIG. 4 illustrates a modification example of the configuration of the main portion in a transmission system 3 relating to the present embodiment.

FIG. 4 illustrates a modification example of the configuration of the main portion of the transmission system relating to the present embodiment.

A transmission system 4 includes therein a transmitter 50 and a receiver 60. In the transmission system 4, the data DT is transferred. The transmitter 50 has a similar configuration to the transmitter 10 of the transmission system 1 shown in FIG. 1. The following description of the modification example puts focus on the difference between the receiver 60 and the receiver 20 included in the transmission system shown in FIG. 1, and does not mention the similarities between the receivers 20 and 60. The receiver 60 includes therein a D flip-flop 61, an XOR gate 62 and a data jitter measuring circuit 63. The D flip-flop 61 and XOR gate 62 are respectively similar to the D flip-flop 21 and XOR gate 22 shown in FIG. 1, and therefore not explained here.

The data jitter measuring circuit 63 measures jitter injected to the first timing edge PErn of the reception signal DTr, and outputs the measured jitter as jitter data JDT. Alternatively, the data jitter measuring circuit 63 measures jitter injected to the timing CEn of the reception clock RCK, and outputs the measured jitter as the jitter data JDT. The data jitter measuring circuit 63 may be, for example, an oscilloscope, a spectrum analyzer, a clock jitter measuring circuit, or the like. As an alternative example, the data jitter measuring circuit 63 may include a pulse generating section, an integrating section and a jitter calculating section.

A case is assumed where the data jitter measuring circuit 63 includes therein the pulse generating section, integrating section and jitter calculating section. The pulse generating section generates a pulse signal having a constant pulse width in synchronization with the edge of the input signal. The integrating section increases the signal level to be output at a predetermined increasing rate while the pulse signal indicates a first logical value (for example, the logical value of "1"), and decreases the signal level to be output at a predetermined decreasing rate while the pulse signal indicates a second logical value (for example, the logical value of "0"). The jitter calculating section calculates the jitter injected to the clock signal based on the respective local maximal and minimal values of the signal level output from the integrating section. When no jitter is injected, the signal level output from the integrating section takes constant local maximal and minimal values or linearly increases or decreases. Considering this, the jitter calculating section calculates, as the jitter JDT, the differences from the constant local maximal and minimal values. In the above-described manner, the data jitter measuring circuit 63 can measure the jitter injected to the reception signal DTr and reception clock signal RCK.

With the above-described configuration, the transmission system 4 relating to the modification example of the present embodiment can realize a circuit which can reduce the bit errors generated in the data received by the receiver 40 and, at the same time, measure jitter to appropriately demodulate the received data with the jitter injected thereto.

While one aspect of the present invention has been described through the embodiment, the technical scope of the invention is not limited to the above described embodiment. It is apparent to persons skilled in the art that various alternations and improvements can be added to the above-described embodiment. It is also apparent from the scope of the claims that the embodiments added with such alternations or improvements can be included in the technical scope of the invention.

The application of the present invention is not limited to a case where the data DT is indicated by a binary signal made up by 0s and 1s. The present invention can be exercised when the data is indicated by a signal expressed by using three different logical values "0", "1" and "2", or four different logical values "0", "1", "2" and "3". For example, the transmitter of the transmission system transmits a complementary data signal CDT in addition to a transmission signal indicating the data DT, and the signal level of the complementary data signal CDT varies at a timing at which the signal level of the transmission signal does not vary. The receiver of the transmission system can generate the reception clock RCK which is hardly influenced by deterministic jitter or the like by obtaining an XOR between the received data signal and complementary data signal CDT.

As clearly indicated by the above description, one embodiment of the present invention can realize a transmission system, a transmitter, a receiver and a transmission method in which a circuit constituted by small-sized and simple logical gates is provided so as to reduce the bit errors generated in the data received by the receiver.

What is claimed is:

1. A transmission system in which a data sequence is transferred, comprising:
    a transmitter that transmits a first transfer signal including an edge-present data waveform which has (i) a first timing edge indicating a timing to obtain data included in the data sequence and (ii) a level signal indicating a signal level corresponding to a value of the data; and
    a receiver that outputs the value of the data in accordance with the signal level which is detected at the timing indicated by the first timing edge of the edge-present data waveform, wherein
    the transmitter includes:
        a first transmitting section that transmits the first transfer signal which is obtained by shaping one or more of pieces of data included in the data sequence into edge-present data waveforms and shaping one or more remaining pieces of data included in the data sequence into edge-absent data waveforms each of which does not include the first timing edge but has the level signal; and
        a second transmitting section that transmits a second transfer signal which has a second timing edge indicating a timing to obtain the level signal of each of the edge-absent data waveforms but does not have an edge indicating a timing to obtain the level signal of each of the edge-present data waveforms,
    the receiver outputs a data value in accordance with a signal level of each of the edge-absent data waveforms which is detected at the timing indicated by the second timing edge,
    the first transmitting section transmits, as the first transfer signal, (i) in one or more cycles in each of which a data value is the same as a data value in a preceding cycle, the edge-absent data waveforms each of which has a signal level maintained at the same level during a duration of a corresponding one of the cycles and (ii) in one or more cycles in each of which a data value is different from a data value in a preceding cycle, the edge-present data waveforms each of which has a signal level varying at the first timing edge from a signal level in a preceding cycle to a signal level corresponding to a data value in a corresponding one of the cycles, and
    the second transmitting section transmits the second transfer signal whose signal level varies at the second timing edge, in a cycle in which a data value is the same as a data value in a preceding cycle.

2. The transmission system as set forth in claim 1, wherein the receiver includes:
    a clock generating section that generates a reception clock which contains the first and second timing edges based on the first and second transfer signals; and
    a data obtaining section that obtains the first transfer signal at a timing indicated by the reception clock, thereby outputting a data value included in the data sequence.

3. The transmission system as set forth in claim 1, wherein the data sequence includes pieces of binary data,
    the first transmitting section transmits, as the first transfer signal, (i) in a cycle in which a data value is the same as a data value in a preceding cycle, a logical value which is the same as a logical value in the preceding cycle and (ii), in a cycle in which a data value is different from a data value in a preceding cycle, a logical value obtained by inverting a logical value in the preceding cycle, and
    the second transmitting section transmits, as the second transfer signal, (i) in a cycle in which a data value is the same as a data value in a preceding cycle, a logical value obtained by inverting a logical value in the preceding cycle and (ii), in a cycle in which a data value is different from a data value in a preceding cycle, a logical value which is the same as a logical value in the preceding cycle.

4. The transmission system as set forth in claim 3, wherein the receiver includes:
    a clock generating section that generates a reception clock which contains the first and second timing edges by calculating a logical XOR between the first and second transfer signals; and
    a data obtaining section that obtains the first transfer signal at a timing indicated by the reception clock, thereby outputting a data value included in the data sequence.

5. A transmitter for transmitting a data sequence, comprising:
    a first transmitting section that (I), in one or more cycles in each of which a data value is different from a data value in a preceding cycle, shapes data included in the data sequence into edge-present data waveforms each of which has (i) a first timing edge indicating a timing to obtain corresponding data and (ii) a level signal indicating a signal level varying at the first timing edge from a signal level in a preceding cycle to a signal level corresponding to a data value of data in a corresponding one of the cycles and (II), in one or more cycles in each of which a data value is the same as a data value in a preceding cycle, shapes data included in the data sequence into edge-absent data waveforms each of which (i) does not have the first timing edge and (ii) has a level signal indicating a signal level maintained at the same level during a duration of a corresponding one of the cycles, and (III) transmits a first transfer signal having the edge-present data waveforms and the edge-absent data waveforms; and
    a second transmitting section that transmits a second transfer signal which has a second timing edge indicating a timing to obtain the level signal of each of the edge-absent data waveforms but does not have an edge indicating a timing to obtain the level signal of each of the edge-present data waveforms.

6. A receiver for receiving a data sequence, comprising:

a first receiving section that receives a first transfer signal which is obtained by (I), in one or more cycles in each of which a data value is different from a data value in a preceding cycle, shaping data included in the data sequence into edge-present data waveforms each of which has (i) a first timing edge indicating a timing to obtain corresponding data and (ii) a level signal indicating a signal level varying at the first timing edge from a signal level in a preceding cycle to a signal level corresponding to a data value of data in a corresponding one of the cycles and (II), in one or more cycles in each of which a data value is the same as a data value in a preceding cycle, shaping data included in the data sequence into edge-absent data waveforms each of which (i) does not have the first timing edge and (ii) has a level signal indicating a signal level maintained at the same level during a duration of a corresponding one of the cycles;

a second receiving section that (a) receives the first transfer signal, (b) receives a second transfer signal which has a second timing edge indicating a timing to obtain the level signal of each of the edge-absent data waveforms but does not have an edge indicating a timing to obtain the level signal of each of the edge-present data waveforms, the signal level of the second transfer signal varying at the second timing edge in a cycle in which a data value is the same as a data value in a preceding cycle, and (c) generates a reception clock signal based on the first transfer signal and the second transfer signal; and a reception section that outputs a data value in accordance with the signal level of each of the edge-present data waveforms which is detected at the timing indicated by the reception clock signal.

7. A transmission method for transferring a data sequence, comprising:

in one or more cycles in each of which a data value is different from a data value in a preceding cycle, shaping data included in the data sequence into edge-present data waveforms each of which has (i) a first timing edge indicating a timing to obtain corresponding data and (ii) a level signal indicating a signal level varying at the first timing edge from a signal level in a preceding cycle to a signal level corresponding to a data value of data in a corresponding one of the cycles;

in one or more cycles in each of which a data value is the same as a data value in a preceding cycle, shaping data included in the data sequence into edge-absent data waveforms each of which (i) does not have the first timing edge and (ii) has a level signal indicating a signal level maintained at the same level during a duration of a corresponding one of the cycles;

transmitting a first transfer signal which has the edge-present data waveforms and the edge-absent data waveforms;

transmitting a second transfer signal which has a second timing edge indicating a timing to obtain the level signal of each of the edge-absent data waveforms but does not have an edge indicating a timing to obtain the level signal of each of the edge-present data waveforms, the signal level of the second transfer signal varying at the second timing edge in a cycle in which a data value is the same as a data value in a preceding cycle; and outputting a data value in accordance with the signal level of each of the edge-present data waveforms which is detected at the timing indicated by the first timing edge.

* * * * *